(12) United States Patent
Favaretto

(10) Patent No.: US 10,590,840 B2
(45) Date of Patent: Mar. 17, 2020

(54) METHOD TO CONTROL AN ELECTRICALLY-OPERATED TURBOCHARGER IN A SUPERCHARGED INTERNAL COMBUSTION ENGINE FOR INCREASING ACOUSTICAL EMISSION IN THE EXHAUST

(71) Applicant: FERRARI S.p.A., Modena (IT)

(72) Inventor: Fabrizio Favaretto, Formigine (IT)

(73) Assignee: FERRARI S.P.A., Modena (IT)

(*) Notice: Subject to any disclaimer, the term of this patent is extended or adjusted under 35 U.S.C. 154(b) by 138 days.

(21) Appl. No.: 15/872,192

(22) Filed: Jan. 16, 2018

(65) Prior Publication Data

US 2018/0202353 A1  Jul. 19, 2018

(30) Foreign Application Priority Data

Jan. 17, 2017  (IT) .................. 102017000004557

(51) Int. Cl.
*F02B 39/10* (2006.01)
*F01N 5/04* (2006.01)
(Continued)

(52) U.S. Cl.
CPC .............. *F02B 39/10* (2013.01); *F01D 15/10* (2013.01); *F01N 1/08* (2013.01); *F01N 1/18* (2013.01);
(Continued)

(58) Field of Classification Search
CPC ..... F01N 1/16; F01N 1/18; F01N 5/04; Y02T 10/144; F02B 37/00–24; F02B 39/10;
(Continued)

(56) References Cited

U.S. PATENT DOCUMENTS

| 10,174,653 | B2* | 1/2019 | Petley | ..................... F01N 1/065 |
| 2006/0218923 | A1* | 10/2006 | Sopko, Jr. | ................. B60K 6/46 |
| | | | | 60/607 |
| 2016/0138508 | A1* | 5/2016 | Sczomak | .............. H04W 76/10 |
| | | | | 701/2 |

FOREIGN PATENT DOCUMENTS

DE      4131438 C1      12/1992
DE  102010005912 A1 *   7/2011   .............. F02B 37/24
(Continued)

OTHER PUBLICATIONS

Search Report issued in Italian Patent Application No. 2017000004557, dated Oct. 5, 2017; 7 pages.

*Primary Examiner* — Laert Dounis
(74) *Attorney, Agent, or Firm* — Cantor Colburn LLP

(57) ABSTRACT

A method to control an electrically-operated turbocharger in a supercharged internal combustion engine, wherein the turbocharger has: a turbine, which is inserted in an exhaust duct to rotate under the thrust of the exhaust gases and operates an electric generator, and a compressor, which is mechanically independent of the turbine, is inserted in an intake duct to increase the air pressure and is operated by an electric engine; wherein the control method comprises the steps of: establishing when the intensity of the acoustic emission in the exhaust of the internal combustion engine needs to be increased; and reducing the mechanical power actually absorbed by the electric generator relative to the available mechanical power to increase the intensity of the acoustic emission in the exhaust of the internal combustion engine.

6 Claims, 1 Drawing Sheet

(51) Int. Cl.
- *F02B 37/12* (2006.01)
- *F01N 1/18* (2006.01)
- *F02B 41/10* (2006.01)
- *F02D 41/00* (2006.01)
- *F02B 37/00* (2006.01)
- *F01N 1/08* (2006.01)
- *F01N 9/00* (2006.01)
- *F01D 15/10* (2006.01)
- *F02B 33/40* (2006.01)

(52) U.S. Cl.
CPC .................. *F01N 5/04* (2013.01); *F01N 9/00* (2013.01); *F02B 33/40* (2013.01); *F02B 37/00* (2013.01); *F02B 37/12* (2013.01); *F02B 41/10* (2013.01); *F02D 41/0007* (2013.01); *F01N 2900/0408* (2013.01); *F02D 2200/025* (2013.01); *F02D 2200/604* (2013.01); *Y02T 10/144* (2013.01); *Y02T 10/16* (2013.01); *Y02T 10/163* (2013.01); *Y02T 10/47* (2013.01)

(58) Field of Classification Search
CPC ......... F05B 2270/333; F05D 2270/333; F02M 35/1294; B60Q 5/00–008
See application file for complete search history.

(56) References Cited

FOREIGN PATENT DOCUMENTS

| | | |
|---|---|---|
| DE | 102015119016 A1 | 5/2016 |
| EP | 2096277 A1 | 2/2009 |
| FR | 3014947 A1 | 6/2015 |
| WO | 2016000016 A1 | 1/2016 |

* cited by examiner

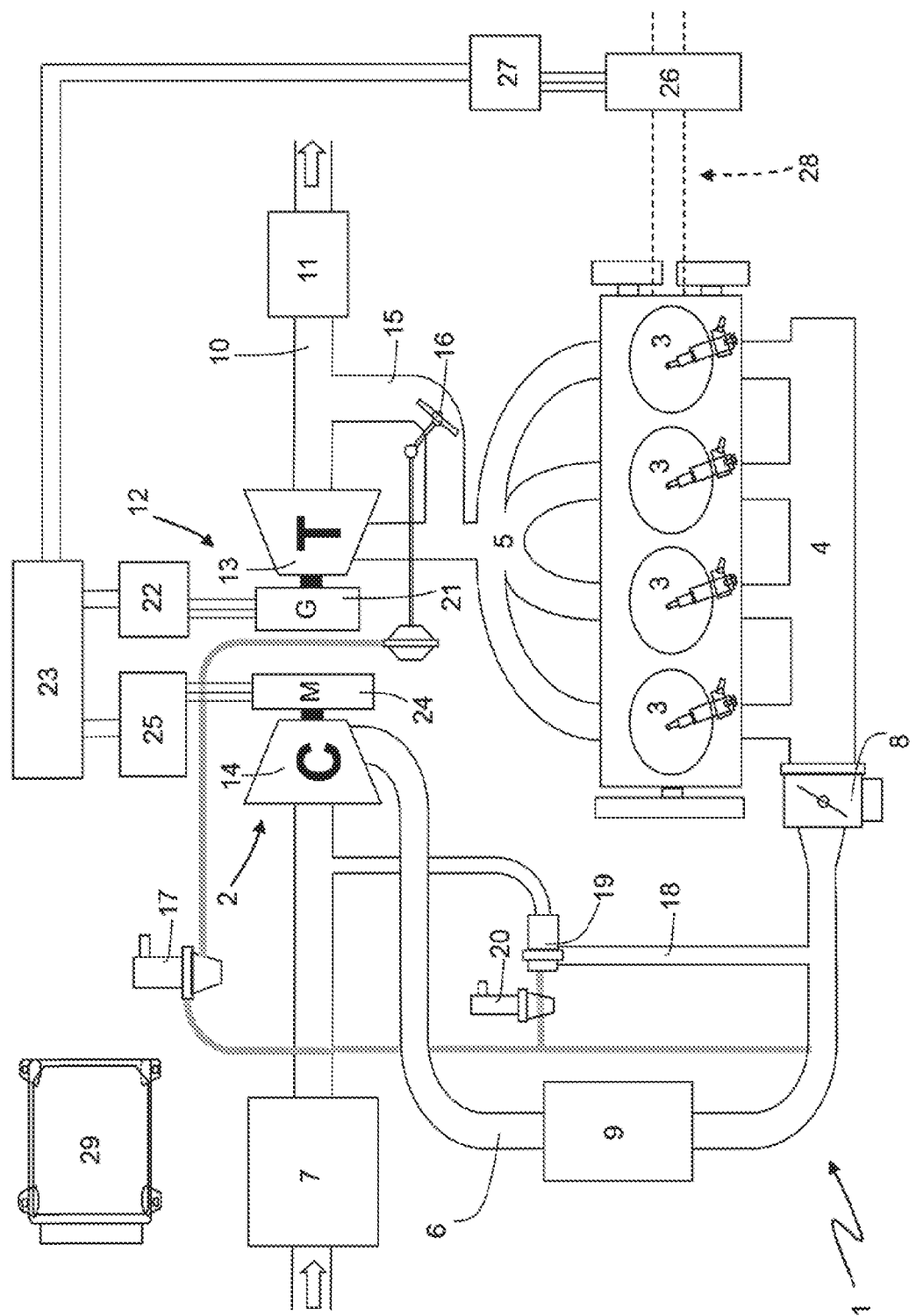

METHOD TO CONTROL AN ELECTRICALLY-OPERATED TURBOCHARGER IN A SUPERCHARGED INTERNAL COMBUSTION ENGINE FOR INCREASING ACOUSTICAL EMISSION IN THE EXHAUST

PRIORITY CLAIM

This application claims the priority of the Italian Patent Application no. 102017000004557 filed on Jan. 17, 2017, whose content is incorporated herein as a reference.

TECHNICAL FIELD

The present invention relates to a method to control an electrically-operated turbocharger in a supercharged internal combustion engine.

PRIOR ART

As already known, some internal combustion engines are equipped with a supercharged turbocharger system, which can increase the power developed by the engine by exploiting the exhaust gas enthalpy to compress the air taken in by the engine and then increase the volumetric efficiency of the air intake. A conventional supercharged turbocharger system comprises a turbocharger provided with a single common shaft supporting a turbine, which is arranged along an exhaust duct to rotate at high speed under the thrust of the exhaust gases expelled from the engine, and a compressor, which is rotated by the turbine and is arranged along the air intake duct to compress the air taken in by the engine.

The sizing and the control mode of a turbocharger are always a compromise between the needs of the compressor and the needs of the turbine and between the need to limit the "turbo-lag" and the need to provide a significant power increase. Consequently, most of the time neither of the two pneumatic machines can operate under optimal conditions. Furthermore, the two pneumatic machines must be designed to work together (i.e. always at the same speed of rotation); as a result, the two pneumatic machines cannot be optimized to maximize their yields.

It has been proposed (as described e.g. in US 2006218923A1) to connect a reversible electric machine to the turbocharger shaft to improve the operation of the turbocharger. Said machine can be operated as an electric motor to accelerate the compressor as soon as the supplied power needs to be increased, therefore without waiting for the effect of the volume and speed increase in the exhaust gases, and can be operated as an electric generator to "regenerate" the mechanical power produced by the turbine and not used by the compressor. However, even in these solutions, the compressor and the turbine are angularly integral, therefore always rotating at the same speed. To overcome the aforesaid drawbacks, the patent application EP2096277A1 describes a turbocharger comprising a turbine, which rotates an electric generator, and a compressor, which is mechanically independent of the turbine and is rotated by an electric motor. This structural solution allows obtaining a maximum operating flexibility of the compressor and of the turbine, which, being mechanically completely independent of each other, can be only operated to optimize their performance under all possible operating conditions.

A relevant element when evaluating a high-performance sports car is the "quality" of the sound emitted in the exhaust (not only in terms of sound intensity, but above all in terms of sound "pleasantness"). In fact, the level of satisfaction deriving by the use of a high-performance sports car is also remarkably influenced by the "quality" of the sound emitted in the exhaust. Several high-performance sports cars have a variable geometry exhaust system that allows an active control of the sound emitted in the exhaust, i.e. an exhaust system equipped with one or more electrically-operated valves that allow modifying the exhaust gas path (and therefore the sound) along the exhaust system. Consequently, in use, the electronic engine control unit modifies in real time the geometry of the exhaust system, always trying to obtain a sound in the exhaust corresponding to the expectations of the car users. The patent application US2016138508A1 describes a vehicle equipped with a turbocharged internal combustion engine, in which the driver can adjust the noise perceived inside the passenger compartment either by acting on a bypass valve arranged along the exhaust system or by acting on the sound reproduced by speakers in the passenger compartment.

However, currently variable geometry exhaust systems cannot always guarantee an optimal sound in the exhaust under all operating conditions, since the valves used in the exhaust systems are generally of the ON/OFF type, thus allowing only a coarse regulation of the noise emissions.

DESCRIPTION OF THE INVENTION

The object of the present invention is to provide a method to control an electrically-operated turbocharger in a supercharged internal combustion engine wherein said control method is free from the aforesaid disadvantages, namely allows improving the sound "quality" in the exhaust being, at the same time, easy and inexpensive to manufacture.

According to the present invention, it is provided a control method of an electrically-operated turbocharger in a supercharged internal combustion engine, as claimed by the appended claims.

BRIEF DESCRIPTION OF THE DRAWINGS

The present invention will now be described with reference to the attached drawing showing an example of a non-limiting embodiment; in particular, the attached FIGURE is a schematic view of a supercharged internal combustion engine comprising an electrically-operated turbocharger in accordance with the present invention.

PREFERRED EMBODIMENTS OF THE INVENTION

In the enclosed FIGURE, the reference number 1 indicates as a whole an internal combustion engine supercharged by means of a supercharging turbocharger system 2.

The internal combustion engine 1 comprises four cylinders 3, each of which is connected to an intake manifold 4 through at least one respective intake valve (not shown) and to an exhaust manifold 5 through at least one respective exhaust valve (not shown). The intake manifold 4 receives fresh air (i.e. air from the external environment) through an intake duct 6, which is provided with an air filter 7 and is regulated by a throttle 8. Along the intake duct 6 there is an intercooler 9 for cooling the air. An exhaust duct 10 is connected to the exhaust manifold 5, said duct supplying the exhaust gases produced by combustion to an exhaust system, which releases the gases produced by combustion into the atmosphere and usually comprises at least one catalyst 11 and at least one silencer (not shown) arranged downstream of the catalyst 11.

The supercharging system 2 of the internal combustion engine 1 comprises a turbocharger 12 provided with a turbine 13, which is arranged along the exhaust duct 10 to rotate at high speed under the action of the exhaust gases expelled by the cylinders 3, and a compressor 14, which is arranged along the intake duct 6 to increase the pressure of the air supplied by the intake duct 6 and is mechanically independent of the turbine 13 (i.e. has no mechanical connection with the turbine 13).

A bypass duct 15, which is connected in parallel to the turbine 13 so that its ends are connected upstream and downstream of the turbine 13, is provided along the exhaust duct 10. A wastegate valve 16 arranged along the bypass duct 15 adjusts the flow rate of the exhaust gases flowing through the bypass duct 15 and is operated by an actuator 17. A bypass duct 18 provided along the intake duct 6 is connected in parallel to the compressor 14 so that its ends are connected upstream and downstream of the compressor 14. A $P_{off}$ valve 19 arranged along the bypass duct 18 adjusts the flow rate of the intake gases flowing through the bypass duct 18 and is operated by an actuator 20.

The turbine 13 and the compressor 14 are not mechanically connected and can therefore be arranged in different regions of the internal combustion engine 1. The turbine 13 is keyed to an electric generator 21, which is rotated by the turbine 13 to generate electric current. The electric generator 21 is electrically connected to an electronic operating device 22, which in turn is connected to a storage system 23 formed by a battery or by a battery pack. The compressor 14 is keyed to an electric motor 24, which rotates the compressor 14. The electric motor 24 is electrically connected to an electronic operating device 25, which in turn is connected to the storage system 23. Preferably (but not necessarily), it is provided a reversible electric machine 26, which can be operated as an electric motor to absorb electrical energy and produce a mechanical driving torque or as a generator to absorb mechanical energy and produce electrical energy. The reversible electric machine 26 is electrically connected to an electronic operating device 27 connected, in turn, to the storage system 23. Furthermore, the reversible electric machine 26 is mechanically connected, directly or indirectly, to a transmission line 28 of the internal combustion engine 1, which transmits the driving torque generated by the internal combustion engine 1 to the drive wheels. For example, the reversible electric machine 27 can be mechanically connected to a drive shaft of the internal combustion engine 1, to a primary shaft of a gearbox, to a secondary shaft of a gearbox or directly to the drive wheels.

The internal combustion engine 1 is operated by an electronic control unit 29, which supervises the operation of all the components of the internal combustion engine 1, including the supercharged system 2. In particular, the electronic control unit 29 operates the actuators 17 and 20 of the wastegate valve 16 and of the $P_{off}$ valve 19 and the operating devices 22, 25 and 27.

During the operation of the internal combustion engine 1, the electronic control unit 26 operates, in mutually independent manner, the electric motor 24, which rotates the compressor 14, and the electric generator 21, which is rotated by the turbine 13. In other words, the electronic control unit 26 controls the electric motor 24, which rotates the compressor 14 with the only aim of optimizing the intake of the cylinders 3 according to the required performances (i.e. torque and power to be delivered by the internal combustion engine 1); on the other hand, the electronic control unit 26 controls the electric generator 21, which is rotated by the turbine 13, usually for optimizing the production of electrical energy, i.e. maximizing the generated electric power without compromising the operation of the internal combustion engine 1.

In use, when the internal combustion engine 1 continuously dispenses a relatively high power (e.g. when the vehicle travels on the motorway), the exhaust gases produced in the cylinders 3 have a high enthalpy and consequently the electric generator 21 rotated by the turbine 13 can generate an electric power that is remarkably higher than the electric power absorbed by the electric motor 24 to rotate the compressor 14; under these conditions, the share of electric power generated by the electric generator 21 and not absorbed by the electric motor 24 is supplied to the reversible electric machine 26, which is operated as an engine to generate an additional driving torque, which is added to the driving torque generated by the internal combustion engine 1. This allows maximizing the overall efficiency of the system by fully exploiting the enthalpy of the exhaust gases produced in the cylinders 3.

Instead, in use, when the internal combustion engine 1 is at low engine speeds, thus providing modest power while a rapid increase in the delivered power is required, the electric motor 24 is operated to rapidly increase the intake pressure by absorbing from the storage system 23 an amount of electric power well above the one generated by the electric generator 21 rotated by the turbine 13. In this way, the response of the internal combustion engine 1 to the request for an increase in the delivered power is substantially instantaneous (i.e. completely devoid of the so-called "turbo-lag").

As previously stated, under all operating conditions, the electronic control unit 26 controls the electric motor 24 which rotates the compressor 14 with the only aim of optimizing the intake of the cylinders 3 according to the required performances (i.e. torque and power to be delivered by the internal combustion engine 1). In other words, the control of the compressor 14 exclusively aims at optimizing the combustion in the cylinders 3.

Normally (i.e. for most of the usage time), the electronic control unit 26 operates the electric generator 21, which is rotated by the turbine 13 to maximize the energy efficiency, i.e. to maximize the generated electric power without compromising the operation of the internal combustion engine 1. However, in some particular situations, the electronic control unit 26 operates the electric generator 21 also (or only) aiming at a desired acoustic emission in the exhaust of the internal combustion engine 1. In other words, the electronic control unit 26 aims at a desired acoustic emission in the exhaust of the internal combustion engine 1 and then controls the electric generator 21 based on the desired acoustic emission in the exhaust of the internal combustion engine 1 (i.e. for getting the desired acoustic emission in the exhaust).

Aiming at a desired acoustic emission in the exhaust of the internal combustion engine 1 can be combined, alternatively or in conjunction, with aiming at the energy efficiency, i.e. the electronic control unit 26 could only aim at the desired acoustic emission in the exhaust of the internal combustion engine 1 regardless of the energy efficiency of the system or could compromise between the desired acoustic emission in the exhaust of the internal combustion engine 1 and the energy efficiency.

According to a possible embodiment, the electronic control unit 26 operates the electric generator 21 based on the desired acoustic emission in the exhaust of the internal combustion engine 1 by means of an open-loop control, namely a control strategy without feedback. According to an alternative embodiment, the electronic control unit 26 operates the electric generator 21 based on the desired acoustic emission in the exhaust of the internal combustion engine 1 by means of a closed-loop control, which uses an acoustic signal detected by (at least) a microphone as a feedback variable. As an example, the microphone could be arranged inside the passenger compartment near the driver's head to pick up the sound that is heard by the driver (it could be the same microphone used to make the hands-free calls). Obviously, the electronic control unit 26 could operate the electric generator 21 based on the desired acoustic emission in the exhaust of the internal combustion engine 1 either by means of an open-loop control or by means of a closed-loop control.

According to a preferred embodiment, the desired acoustic emission in the exhaust of the internal combustion engine 1 comprises both an intensity of the acoustic emission in the exhaust of the internal combustion engine 1 and a tone of the acoustic emission in the exhaust of the internal combustion engine 1. One of the two characteristics (generally the intensity, but it could also be the tone in some particular situations) could be considered the main one (namely, more relevant), while the other characteristic (generally the tone, but it could also be the intensity in some particular situations) could be considered the secondary one (namely, less relevant). Alternatively, the acoustic emission in the exhaust of the internal combustion engine 1 comprises only the intensity of the acoustic emission in the exhaust of the internal combustion engine 1 or only the tone of the acoustic emission in the exhaust of the internal combustion engine 1.

The electronic control unit 26 establishes when it is necessary to increase the intensity of the acoustic emission in the exhaust of the internal combustion engine 1 and then reduces the mechanical power actually absorbed by the electric generator 21 relative to the available mechanical power (namely, to the maximum mechanical power absorbable by the electric generator 21 under the current conditions) to increase the intensity of the acoustic emission in the exhaust of the internal combustion engine 1. In other words, in some situations requiring an increase of the intensity of the acoustic emission in the exhaust of the internal combustion engine 1, the electronic control unit 26 "sacrifices" part (or all) of the available mechanical power (i.e. the maximum mechanical power absorbable by the electric generator 21 under the current conditions) to increase the intensity of the acoustic emission in the exhaust of the internal combustion engine 1. In other words, the greater the mechanical power absorbed by the electric generator 21, the more the energy subtracted from the exhaust gases and therefore the greater the sound attenuation of the exhaust gases. As a consequence, the mechanical power absorbed by the electric generator 21 is reduced (cancelled) to increase (maximize) the intensity of the acoustic emission in the exhaust of the internal combustion engine 1.

Normally, the speed of rotation of the electric generator 21 is increased so that the tone of the acoustic emission in the exhaust of the internal combustion engine 1 is more high-pitched and vice versa (i.e., the speed of rotation of the electric generator 21 is reduced to make more low-pitched the tone of the acoustic emission in the exhaust of the internal combustion engine 1). In other words, the faster the rotation of the turbine 13, the more high-pitched the tone of the acoustic emission in the exhaust of the internal combustion engine 1, whereas the slower the rotation of the turbine 13, the more low-pitched the tone of the acoustic emission in the exhaust of the internal combustion engine 1.

According to a preferred embodiment, the electronic control unit 26 coordinately modulates the speed of rotation of the electric generator 21 and the mechanical torque absorbed by the electric generator 21 depending on the desired acoustic emission in the exhaust of the internal combustion engine 1. The mechanical power absorbed by the electric generator 21 is proportional to the product between the mechanical torque absorbed by the electric generator 21 and the speed of rotation of the electric generator 21; therefore, by varying the mechanical torque absorbed by the electric generator 21, the speed of rotation of the electric generator 21 can be varied, though maintaining unaltered the mechanical power absorbed by the electric generator 21, or the mechanical power absorbed by the electric generator 21 can be varied, though maintaining unaltered the speed of rotation of the electric generator 21.

According to a preferred (but not limiting) embodiment, the electronic control unit 26 operates the electric generator depending on the desired acoustic emission in the exhaust of the internal combustion engine 1 only under particular conditions and for short periods of time to provide a particular "sound" in certain situations. For example, when the driver pushes on the accelerator with a sporty driving, the electronic control unit 26 controls the electric generator 21 to obtain a particular "sound" that also acoustically underlines the driving torque crescendo (it should be remarked that renouncing part of the power recoverable through the electric generator 21 for short and limited periods has no relevant effect on the overall energy efficiency). In this regard, it should be remarked that high-performance sports cars allow the driver to select the desired type of driving (comfort, sporty, racy . . . ) and therefore, depending on the type of desired driving, it is possible to establish an adequate and coherent acoustic emission in the exhaust of the internal combustion engine 1.

For example, the mechanical power actually absorbed by the electric generator 21 is reduced relative to the available mechanical power to increase the intensity of the acoustic emission in the exhaust of the internal combustion engine 1 when the speed of rotation of the internal combustion engine 1 (i.e. of the motor shaft of the internal combustion engine 1) is increasing. Preferably, the greater the angular acceleration of the internal combustion engine 1, the more the mechanical power actually absorbed by the electric generator 21 is reduced relative to the available mechanical power.

Finally, it should be remarked that the above described control of the electric generator 21 based on the desired acoustic emission in the exhaust of the internal combustion engine 1 can be used alternatively or in combination with variable geometry exhaust systems.

The previously described control method has several advantages.

First of all, the previously described control method allows obtaining, when desired, an optimum sound in the exhaust of the internal combustion engine 1, even without using variable geometry exhaust systems.

The previously described control method does not entail any physical modification to an electrically-operated turbocharger, but is fully implementable by software. Therefore, the previously described control method is simple and inexpensive to implement even in an existing vehicle (obviously equipped with an electrically-operated turbocharger).

The previously described control method allows obtaining a particularly wide range of variation in the sound in the exhaust, since it acts both on the intensity of the sound in the exhaust and on the tone of the sound in the exhaust. Moreover, the previously described control method allows obtaining a well adjustable range of variation of the sound in the exhaust, since both the mechanical torque (power) absorbed by the electric generator 21 and the speed of rotation of the electric generator 21 may be very finely, precisely and stably varied.

Finally, the previously described control method can be used only when desired and therefore has no relevant negative effect on the overall energy efficiency.

The invention claimed is:

1. A method to control an electrically-operated turbocharger (12) in a supercharged internal combustion engine (1), the control method comprises establishing when an intensity of an acoustic emission in an exhaust of a internal combustion engine (1) needs to be increased, wherein the electrically-operated turbocharger (12) comprises a turbine (13) inserted into an exhaust pipe (10) configured to rotate from a thrust of the exhaust gases and operate an electric generator (21), and a compressor (14), which is mechanically independent of the turbine (13), and is inserted into an intake pipe (6) to increase air pressure and is operated by an electric motor (24); and reducing a mechanical power absorbed by the electric generator (21) relative to an available mechanical power to increase the intensity of the acoustic emission in the exhaust of the internal combustion engine (1).

2. The control method according to claim 1, wherein the mechanical power absorbed by the electric generator (21) is reduced to zero to maximise the intensity of the acoustic emission in the exhaust of the internal combustion engine (1) and the mechanical power absorbed by the electric generator (21) is maximized to minimize the intensity of the acoustic emission in the exhaust of the internal combination engine.

3. The control method according to claim 1, wherein a speed of rotation of the electric generator (21) is increased to make a tone of the acoustic emission in the exhaust of the internal combustion engine (1) more high-pitched and the speed of rotation of the electric generator (21) is reduced to make the tone of the acoustic emission in the exhaust of the internal combustion engine (1) more low-pitched.

4. The control method according to claim 1, wherein the electric generator (21) is normally operated so as to absorb all the available mechanical power, except for short instants, in which the mechanical power absorbed by the electric generator (21) is reduced relative to the available mechanical power to increase the intensity of the acoustic emission in the exhaust of the internal combustion engine (1).

5. The control method according to claim 1, wherein the mechanical power absorbed by the electric generator (21) is reduced relative to the available mechanical power to increase the intensity of the acoustic emission in the exhaust of the internal combustion engine (1) when a speed of rotation of the internal combustion engine (1) is increasing.

6. The control method according to claim 5, wherein the greater an angular acceleration of the internal combustion engine (1), the more the mechanical power absorbed by the electric generator (21) is reduced relative to the available mechanical power.

* * * * *